(12) United States Patent
Medard et al.

(10) Patent No.: US 11,161,134 B2
(45) Date of Patent: Nov. 2, 2021

(54) APPLICATOR OF COATING PRODUCT, MULTIAXIS ROBOT COMPRISING SUCH AN APPLICATOR AND APPLICATION METHOD OF A COATING PRODUCT

(71) Applicant: Exel Industries, Epernay (FR)

(72) Inventors: Cyrille Medard, Varces Allieres et Risset (FR); David Vincent, Grenoble (FR); Cédric Le Strat, Seyssinet Pariset (FR); Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 60 days.

(21) Appl. No.: 16/203,565

(22) Filed: Nov. 28, 2018

(65) Prior Publication Data

US 2019/0091712 A1 Mar. 28, 2019

Related U.S. Application Data

(62) Division of application No. 15/437,455, filed on Feb. 21, 2017, now abandoned.

(30) Foreign Application Priority Data

Mar. 4, 2016 (FR) ...................... 1651839

(51) Int. Cl.
*B05D 1/02* (2006.01)
*B05B 12/12* (2006.01)
(Continued)

(52) U.S. Cl.
CPC .............. *B05B 12/124* (2013.01); *B05B 1/02* (2013.01); *B05B 12/04* (2013.01); *B05B 12/084* (2013.01);
(Continued)

(58) Field of Classification Search
CPC ..... B05B 12/04; B05B 12/084; B05B 12/122; B05B 12/124; B05B 13/0431;
(Continued)

(56) References Cited

U.S. PATENT DOCUMENTS

| 4,421,800 A | 12/1983 | Schoenberg et al. |
| 2008/0048388 A1* | 2/2008 | Gauss ...................... B41J 3/407 271/227 |

(Continued)

FOREIGN PATENT DOCUMENTS

| DE | 102007020287 A1 | 11/2008 |
| DE | 102012005650 A1 | 9/2013 |

(Continued)

OTHER PUBLICATIONS

French Patent Application No. 16 51839, Rapport de Recherche Préliminaire, dated Nov. 2, 2016, 2 pages.

(Continued)

*Primary Examiner* — Alexander M Weddle
(74) *Attorney, Agent, or Firm* — Soquel Group LLC

(57) ABSTRACT

A method of applying a coating product on a surface of a part, this method being carried out using an applicator including at least one row of nozzles, among which at least the first nozzle in the row includes a valve, the method including moving the applicator in a first direction to apply a first layer of coating product, and moving the applicator in a second direction substantially parallel to the first direction to apply a second layer of coating product adjacent to the first layer, comprising measuring at least one application distance of the first nozzle from a point in front of the first nozzle on a path of the applicator, and based on the measured application distance, opening or closing the valve.

6 Claims, 11 Drawing Sheets

(51) Int. Cl.
  *B05B 12/08* (2006.01)
  *B05B 13/04* (2006.01)
  *B41J 3/407* (2006.01)
  *B05B 12/04* (2006.01)
  *B05B 1/02* (2006.01)
  *B05B 17/06* (2006.01)
  *B05D 7/14* (2006.01)
  *B05D 7/00* (2006.01)
  *B05C 11/10* (2006.01)
  *B05D 1/28* (2006.01)
  *B05B 1/14* (2006.01)
  *B05C 5/02* (2006.01)

(52) U.S. Cl.
  CPC ...... *B05B 13/0452* (2013.01); *B05B 17/0653* (2013.01); *B05D 1/02* (2013.01); *B05D 7/14* (2013.01); *B05D 7/54* (2013.01); *B41J 3/4073* (2013.01); *B05B 1/14* (2013.01); *B05B 12/122* (2013.01); *B05B 13/0431* (2013.01); *B05C 5/0291* (2013.01); *B05C 11/1018* (2013.01); *B05D 1/28* (2013.01)

(58) Field of Classification Search
  CPC ... B05B 13/0452; B05B 13/0653; B05B 1/02; B05B 1/14; B05C 11/1018; B05C 5/0291; B05D 1/28; B05D 7/14; B05D 7/54; B25J 11/0075; B41J 3/4073
  See application file for complete search history.

(56) References Cited

U.S. PATENT DOCUMENTS

| | | | |
|---|---|---|---|
| 2010/0183815 A1 | 7/2010 | Marx et al. | |
| 2010/0253742 A1* | 10/2010 | Essen | B41J 2/14145 347/44 |
| 2012/0206515 A1* | 8/2012 | Walker | B41J 2/175 347/6 |
| 2013/0257984 A1 | 10/2013 | Beier et al. | |
| 2013/0284833 A1 | 10/2013 | Fritz et al. | |
| 2014/0312141 A1 | 10/2014 | Ravishankar | |
| 2014/0323992 A1 | 10/2014 | Bae | |
| 2015/0086723 A1 | 3/2015 | Bustgens | |

FOREIGN PATENT DOCUMENTS

| | | |
|---|---|---|
| EP | 1884365 A1 | 2/2008 |
| EP | 1892107 A1 | 2/2008 |
| EP | 2208541 A2 | 7/2010 |
| EP | 2441529 A1 | 4/2012 |
| EP | 2644392 A2 | 10/2013 |
| JP | 2002200454 A | 7/2002 |
| JP | 2004142382 A | 5/2004 |
| JP | 2014111307 A | 6/2014 |
| WO | 2009088864 A1 | 7/2009 |

OTHER PUBLICATIONS

U.S. Appl. No. 15/437,455, Non-Final Rejection, dated Jun. 18, 2018, 9 pages.
EPO Rapport de Recherche Europeenne for Patent Application No. EP 1715 9049, Jun. 26, 2017, 2 pp.
JPO Patent Abstracts of Japan for Publication No. JP2002200454A, 6 pp.
JPO Patent Abstracts of Japan for Publication No. JP2004142382A, 8 pp.
U.S. Appl. No. 15/437,455, Final Rejection, dated Oct. 19, 2018, 11 pages.

* cited by examiner

APPLICATOR OF COATING PRODUCT, MULTIAXIS ROBOT COMPRISING SUCH AN APPLICATOR AND APPLICATION METHOD OF A COATING PRODUCT

CROSS REFERENCE TO RELATED APPLICATIONS

This application claims priority under 35 USC § 119 of French Patent Application No. 16 51839 filed on Mar. 4, 2016.

FIELD OF THE INVENTION

The invention relates to an applicator of a coating product, a multiaxis robot provided with this applicator and a method for applying a coating product on the surface of a part, such as the hood of a motor vehicle. In particular, the method according to the invention makes it possible to apply two layers of coating product with a perfect junction between the two layers.

BACKGROUND OF THE INVENTION

The current trend in the automotive industry, in particular for sports vehicles, is customizable cars. Thus, automobile builders are offering their customers cars whose body paint can be customized. The body can thus be multicolored, with different patterns, such as stripes. One or several stripes in different colors are often seen on sports cars in particular, extending in the longitudinal direction on the hood of the car. To produce these types of stripes, one known technique consists of applying a mask on the rest of the body so as to expose only the surface of the hood corresponding to a stripe being applied. In practice, this mask is done with adhesive paper that is removed once the pattern is created. However, this technique is relatively unpleasant, since it requires applying a mask manually on the body of each vehicle.

Another technique, in particular described in US-A-2013/0284833, consists of using a multiaxis robot, comprising a moving arm on which a specific applicator is mounted. This applicator is a printing head of the inkjet type, which includes at least one row of nozzles through which the coating product flows. A stripe of paint with clean edges can therefore be applied by moving the arm of the robot in a direction perpendicular to the row of nozzles of the printing head. When the width of the stripe one wishes to apply exceeds the width of the printing head, the robot must perform several back and forth movements with trajectories programmed so that the stripes are adjacent; i.e., so that there is no non-overlapping zone between two passes of the printing head. US-A-2013/0284833 discloses, in particular in paragraph [0174], that the nozzles of the printing head make it possible to apply a coating with a distribution having a trapezoidal thickness, in order to avoid excess thicknesses during overlapping and to obtain a coating with a constant thickness. To apply a clean edge, as shown in FIG. 21D of this publication, some of the nozzles of the printing head are deactivated when the applicator passes.

It is known that multiaxis robots have trouble following a predetermined trajectory, for example in a straight line. Thus, the actual trajectory described by the robot fits in an imaginary tube, which is centered on the theoretical trajectory and the outer diameter of which depends on the precision of the robot. A "tubing" phenomenon may cause a defect in the overlapping between two paint stripes at the junction between the two stripes. To offset this problem, it is stated in paragraph [0144] of US-A-2013/0284833 that the applicator comprises an optical sensor able to record the movement line of the applicator to reproduce exactly the same journey during subsequent passes of the applicator. The journey of the arm of the robot is thus adjusted relative to the previous pass to obtain a perfect junction between the layers applied during two successive passes.

One drawback of this technology is that the junction is not perfect when the coating is applied on curved surfaces, like the hood of a car. Non-overlapping zones are then observed between two passes of the applicator.

SUMMARY OF THE DESCRIPTION

The invention more particularly aims to resolve these drawbacks by proposing an applicator of coating products making it possible to obtain a perfect junction between two stripes from two successive passes, even on a curved surface, like the hood of a car.

To that end, the invention relates to an applicator of a coating product on a surface to be coated, including at least one row of nozzles, among which at least the first nozzle in the row includes a valve. According to the invention, the applicator further comprises at least one distance sensor, to measure an application distance of the first nozzle from a point in front of the latter on a path of the applicator, and an electronic control unit of the valve, which is programmed to collect the distance measured by the distance sensor and, based on the collected distance value, to open or close the valve.

According to advantageous but optional aspects of the invention, the applicator of a coating product may comprise any of the following features, considered in any technically possible combination:

Each nozzle in the row comprises a valve, while the distance sensor is able to measure the application distance of at least certain nozzles in the row at respective points in front of the latter on the path of the applicator.

The electronic control unit is programmed to collect the distances measured by the distance sensor, in order to determine a profile of the surface to be coated over all or part of the application width of the applicator, analyze the surface profile to detect the position of an edge of a layer of coating product along the profile of the surface, open all of the valves of the nozzles that are positioned on one side of the edge and close the valves positioned on the other side of the edge along the profile of the surface.

The valves are proportional valves, while the electronic control unit is programmed to establish a thickness profile of the layer of coating product along the axis and to monitor the flow rate of the valves based on the thickness of the layer at each of the forward points.

The distance sensor is a laser sensor, comprising a cell emitting a laser beam and a cell receiving a reflected laser beam, while the distance sensor is able to scan, with its beam, a line perpendicular to the movement direction of the applicator, so as to measure the application distance of at least certain nozzles in the row, at points in front of the latter on the path of the applicator.

Each nozzle in the row comprises a valve and respective distance sensors are provided to measure an application distance of each nozzle at a respective point in front of the latter on the path of the applicator.

Each valve is a piezoelectric valve, the flow rate of which depends on an excitation frequency of the valve.

The electronic control unit is programmed to close the valve of the first nozzle when the distance measured by the sensor is substantially greater than a reference value.

The applicator further comprises at least one thickness measuring sensor, configured to respectively measure the thickness of the film of coating product applied by the nozzles at points withdrawn relative to those on the path of the applicator.

The applicator comprises another row of nozzles, positioned on a delay relative to each thickness measuring sensor on the path of the applicator.

The invention also relates to a multiaxis robot, comprising a moving arm on which an applicator as previously defined is mounted.

The invention also relates to a method of applying a coating product on the surface of a part, this method being carried out using an applicator comprising at least one row of nozzles, among which at least the first nozzle in the row includes a valve, this method comprising the following steps:
  a) moving the applicator in a first direction to apply a first layer of coating product, and
  b) moving the applicator in a second direction substantially parallel to the first direction to apply a second layer of coating product adjacent to the first layer.

According to the invention, step b) further comprises sub-steps consisting of:
  b1) measuring at least one application distance of the first nozzle from a point in front of the latter on a path of the applicator, and
  b2) based on the measured application distance, opening or closing the valve.

According to advantageous, but optional aspects, the method comprises one or more of the following features, considered in any technically allowable combination:
  Sub-step b1) consists of collecting application distances of at least certain nozzles in the row at points respectively in front of the latter on the journey of the applicator, in order to determine a profile of the surface to be coated over all or part of the application width of the applicator, while sub-step b2) consists of analyzing the surface profile to detect the position of an edge of the first layer of coating product along the profile of the surface, and opening all of the valves of the nozzles that are positioned on one side of the edge and closing the valves positioned on the other side of the edge along the profile of the surface.
  The valves are proportional valves, and step b) comprises other sub-steps consisting of establishing a thickness profile of the layer of coating product along the axis, and monitoring the flow rate of the valves based on the thickness of the layer at each of the forward points.
  The method further comprises a step consisting of repositioning the applicator when the surface is vertical or inclined. This repositioning step consists of moving the applicator with a certain amplitude and in a direction parallel to an axis of the row of nozzles to offset the deviation of the coating product due to gravity.
  The movement amplitude of the applicator during the repositioning step is computed dynamically based on the incline of the applicator relative to the ground, the application distance of the nozzles, the ejection speed of the product through the nozzles and the size of the nozzles, or is extracted from a prerecorded chart.
  The method further comprises a step consisting of closing the valve of the nozzle(s) that may, due to gravity, spray coating product on a zone of the surface covered by the first layer of coating product.
  The valves are proportional valves, and step b) further comprises the following sub-steps: i) evaluating the incline of the surface portion intended to be covered by each nozzle relative to a plane perpendicular to a spray axis of the nozzles, and ii) monitoring the flow rate of coating product applied by each nozzle based on the incline of the surface portion intended to be covered by the corresponding nozzle.

If, during step b), the robot follows its setpoint trajectory, the distance measured by the distance sensor at a point ahead of the first nozzle on the path of the applicator is substantially below a reference value, which corresponds to the application distance of the nozzles when there is no coating product. This means that the application zone of the first nozzle at a point up ahead on the path of the applicator is already covered with coating product. Owing to the invention, the valve of the first nozzle is closed, and no coating product is applied by the first nozzle when the latter reaches the point up ahead, which makes it possible to avoid an excess thickness at the junction between the two stripes.

Conversely, if the robot deviates from a setpoint trajectory, for example due to the "tubing" phenomenon, the distance measured by the distance sensor at a point ahead of the first nozzle on the path of the applicator is substantially equal to the reference value. This means that the application zone of the first nozzle at a point up ahead on the path of the applicator is not covered with coating product. Owing to the invention, the valve of the first nozzle is open. The first nozzle then coats the surface when it reaches the point up ahead on the path of the applicator. This makes it possible to avoid zones that are not covered and obtain a perfect junction between the two layers of coating product. The valve of the first nozzle is therefore monitored dynamically, i.e., in real time, on the path of the applicator. This dynamic adjustment makes it possible to apply a stripe of coating product with a perfect junction relative to another existing stripe, even on a curved surface such as the hood of a car. The junction between two paint stripes is therefore provided by the dynamic control of the valve, without using an ultraprecise robot or an improved trajectory controller.

BRIEF DESCRIPTION OF THE DRAWINGS

The invention and other advantages thereof will appear more clearly in light of the following description of seven embodiments of a coating product applicator according to its principle, provided solely as an example and done in reference to the appended drawings, in which.

DETAILED DESCRIPTION

Figure 1:
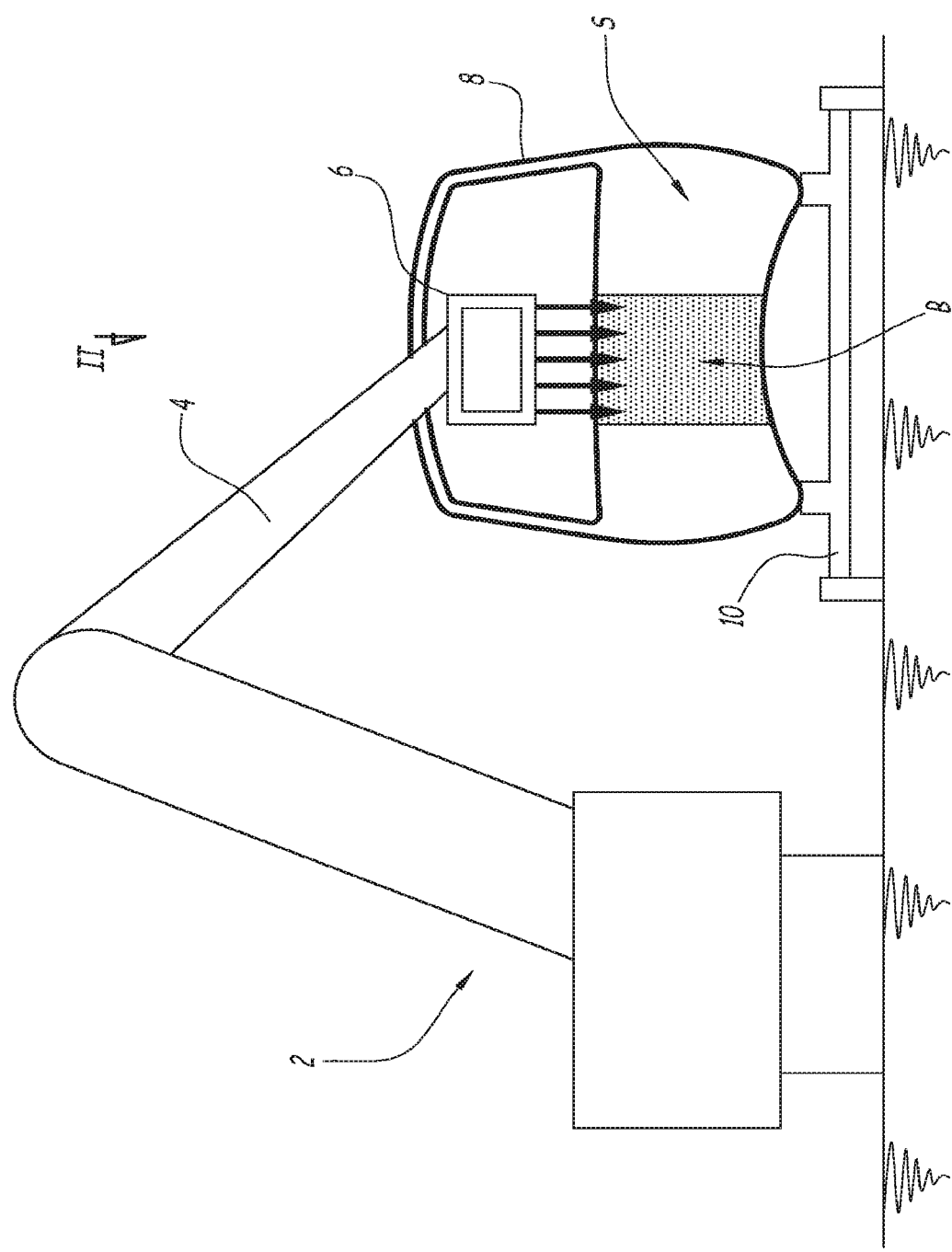
FIG. 1 is a schematic illustration of a multiaxis robot comprising a moving arm on which a coating product applicator according to the invention is mounted.

FIG. 1 shows a multiaxis robot 2 comprising a moving arm 4 on which a coating product applicator 6 is mounted. The applicator 6 is a printing head of the inkjet type. In the example, the coating product in question is paint, but it may also be a primer, ink or varnish. The multiaxis robot 2 is positioned alongside a conveyor 10 moving motor vehicle bodies 8. In the example, the multiaxis robot 2 is designed to apply a stripe of paint B on the surface S of the hood of each body 8 moved by the conveyor 10. The robot 2 comprises a controller, not shown, programmed to control the arm 4 so as to follow a setpoint trajectory.

The coating product applicator 6 comprises a row of nozzles, referenced 60.1 to 60.$i$ in the figures, i being the number of nozzles in the row, which is greater than or equal to 2, and for example comprised between 10 and 100. The nozzles 60.1 to 60.$i$ in the row are positioned perpendicular to the movement direction of the applicator 6 during the application of the coating product. In the example, the nozzles 60.1 to 60.$i$ are configured to deposit the coating product dropwise. Once deposited, the drop spreads on the surface to be coated. A spreading coefficient is defined as the ratio between the area of the surface that is coated once the drop has spread and the diameter of the drop. This spreading coefficient in particular depends on the type of coating product used. It is comprised between 5 and 10, often about 7.

Alternatively, the nozzles can be configured to form a continuous web of coating product.

Advantageously, the nozzles 60.1 to 60.$i$ are holes formed in a plate, the width of the drops or the web then corresponding to the width of the holes.

Figure 4:
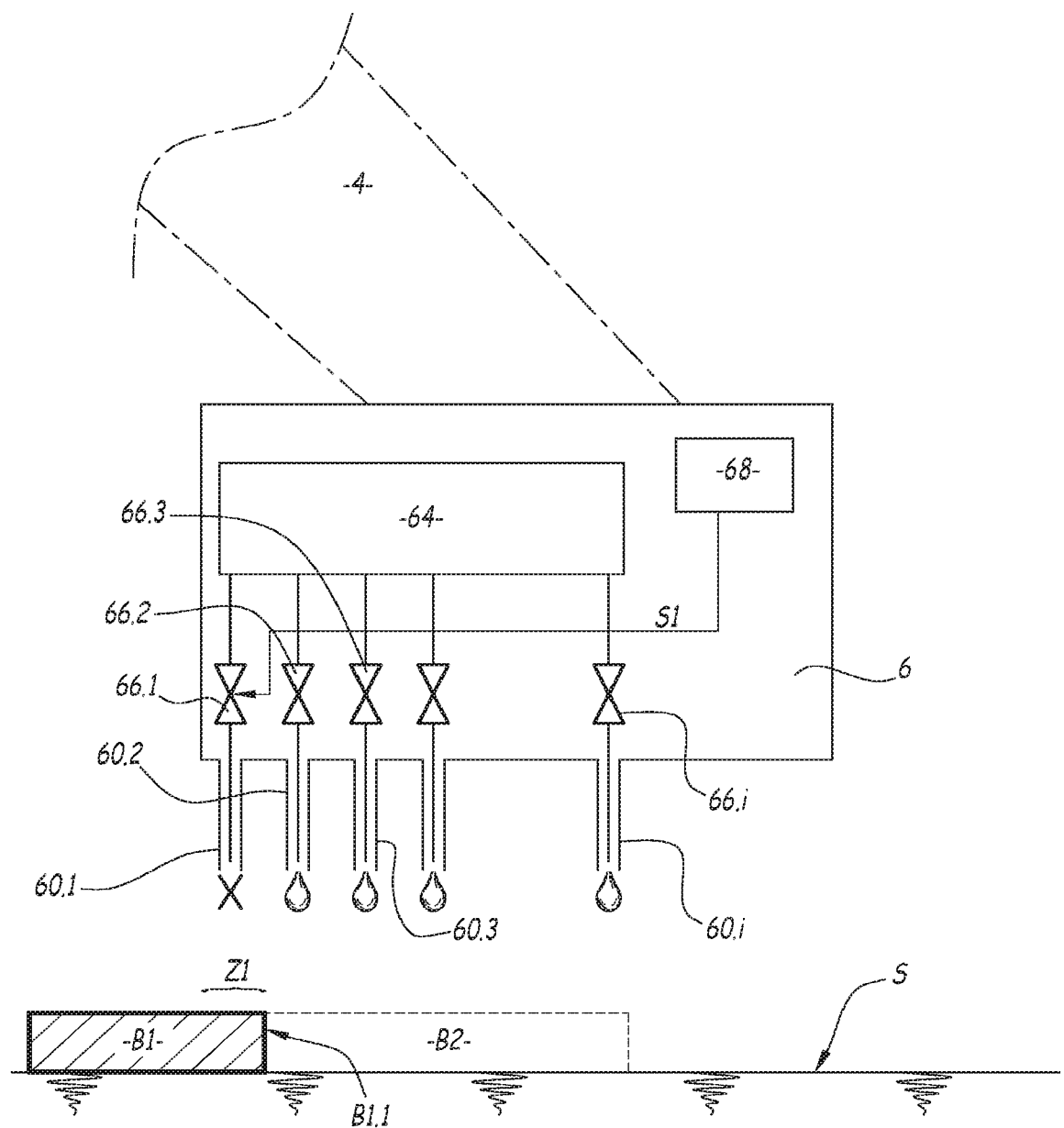
FIG. 4 is a schematic sectional view of the applicator along line IV-IV of FIG. 3.

As shown in FIG. 4, each nozzle 60.1 to 60.$i$ in the row comprises a valve 66.1 to 66.$i$, respectively. The valves 66.1 to 66.$i$ of the applicator 6 are each connected to a shared reservoir 64 of coating product. The valves 66.2 to 66.$i$ are optional for carrying out the invention.

In the example, the valves 66.1 to 66.$i$ are electrically controlled valves, in particular piezoelectric valves.

Piezoelectric valves are so-called exciter valves, comprising a piezoelectric element that is deformable when an electric excitation is applied. This type of valve works as follows. When the piezoelectric element is not excited, the fluid remains inside the reservoir 64 because the atmospheric pressure is higher than the pressure of the reservoir. Conversely, when the piezoelectric element is excited, for example with an alternating voltage, it then locally generates an overpressure allowing the fluid to flow outside the reservoir.

The flow rate of coating product ejected through the nozzles 60.1 to 60.$i$ can be adjusted by acting on the excitation frequency of the respective valves 66.1 to 66.$i$. These are then called proportional valves.

In the present document, a valve refers to any device making it possible to control the flow of the coating product. In particular, according to an alternative that is not shown, the valves 66.1 to 66.$i$ are so-called shutoff valves, which work by selectively shutting off the fluid passage line.

According to another alternative that is not shown, another type of exciter valve can be considered to equip the applicator 6. This may be a valve with thermal, acoustic, pneumatic or electrostatic excitation.

The applicator 6 comprises remote sensors 62.1 to 62.$i$ that are positioned at points ahead of the nozzles 60.1 to 60.$i$ on the path of the applicator 6. The sensors 62.1 to 62.$i$ are arranged in a row, which is parallel to the row of nozzles 60.1 to 60.$i$. The applicator 6 includes as many distance sensors 62.1 to 62.$i$ as there are nozzles 60.1 to 60.$i$. Each sensor 62.1 to 62.$i$ is therefore associated with a nozzle. For example, the sensor 62.1 is associated with the nozzle 60.1. Thus, the position of the sensors 62.1 to 62.$i$ along the path of the applicator 6 at a moment t corresponds to that of the nozzles 60.1 to 60.$i$ at moment t+$\Delta$t, where $\Delta$t is a duration that depends on the movement speed of the applicator 6 and the distance d6 between the row of nozzles 60.1 to 60.$i$ and the row of sensors 62.1 to 62.$i$, measured parallel to the movement direction of the applicator 6. The distance sensors 62.2 to 62.$i$ are optional for carrying out the invention.

The distance sensors 62.1 to 62.$i$ measure, at each moment t, the distance between the applicator 6 and the portion of the surface to be coated S that is across from them. Yet at moment t+$\Delta$t, the nozzles 62.1 to 62.$i$ reach the position of the sensors 60.1 to 60.$i$ at moment t. The distance measured by the sensors 62.1 to 62.$i$ at moment t therefore respectively corresponds to the application distance of the nozzles 60.1 to 60.$i$ at moment t+$\Delta$t; i.e., the distance between the nozzles and the part to be coated, measured along a direction parallel to a spraying axis of the coating product through the nozzles. Each distance sensor 62.1 to 62.$i$ therefore measures the application distance of the nozzle with which it is associated at a point, on the path of the applicator 6, that is up ahead relative to the nozzle 60.1 to 60.$i$ associated with it.

Advantageously, each distance sensor 62.1 to 62.$i$ is a laser sensor, comprising a cell emitting a laser beam and a cell receiving a reflected laser beam, on the surface S. The laser beam emitted by the emitting cell is substantially parallel to the spraying axis of the coating product through the nozzles 60.1 to 60.$i$. In the example, the precision of each sensor is less than 10 μm, in particular about 1 μm.

The applicator 6 further comprises an electronic control unit 68. The electronic control unit 68 controls the opening and closing of each of the valves 66.1 to 66.$i$. To that end, the unit 68 sends each of the valves 66.1 to 66.$i$ control signals, among which the electric control signal S1 of the valve 66.1 is schematically shown in FIG. 4. Based on the received signal, the valve 66.1 opens or closes. Each distance sensor 62.1 to 62.$i$ is connected to the unit 68. The electronic control unit 68 can therefore collect the distance measured by the sensors at each moment t. The electronic control unit 68 is able to compare the distance measured by each of the sensors 62.1 to 62.*i* with a reference value D. This reference value D corresponds to the distance between the nozzles 60.1 to 60.*i* and the surface to be coated as when the latter is not covered with coating product. In other words, the reference value D corresponds to the application distance of the nozzles 60.1 to 60.*i*.

In the example, this reference value D is a predetermined value that is identical for all of the nozzles 60.1 to 60.*i*. Furthermore, it is a constant value over time; i.e., the same distance d1 is used irrespective of the position of the applicator 6 on its path. The distance d1 can then be prerecorded in the memory of the electronic control unit 68.

However, alternatively, the reference value D is specific to each nozzle and/or is not a constant function over time; i.e., this reference value D varies depending on the position of the applicator 6 on its path. This alternative is advantageous when the surface to be coated is warped; i.e., when the application distance varies substantially from one nozzle to another and/or varies substantially over the path of the applicator 6. In this case, the distance D to which the distance sent by the sensors at each moment is compared can be acquired by learning, by moving the applicator 6 a first time "blank"; i.e., without applying coating product. The values acquired by the sensors 62.1 to 62.*i* during the learning then serve as reference distances, like the reference value D.

A method for applying a coating B on a surface to be coated S is described below in relation to FIGS. 2 to 5. This method is carried out by the applicator 6 described above. In the example, the surface S to be coated is the hood of a car 8. The coating B visible in FIG. 1 is formed by two layers B1 and B2 of coating product. In the example, the layers of product B1 and B2 are stripes extending in the longitudinal direction of the hood. The stripes B1 and B2 are applied to be adjacent; i.e., such that there is no non-covered zone between the stripes B1 and B2.

Figure 2:
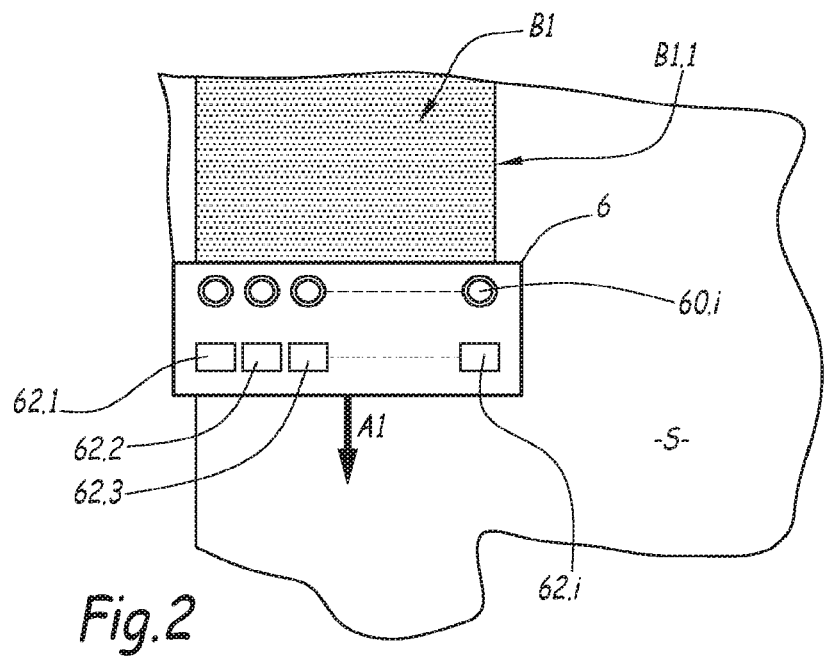
FIG. 2 is a partial elevation view in the direction of arrow II in FIG. 1, showing the coating product applicator in a configuration where it makes a first pass over a surface to be coated, so as to form a first stripe.

FIG. 2 illustrates a step a) during which the applicator 6 makes a first pass to apply a first stripe B1 on the surface to be coated S. The movement direction of the applicator 6 is shown in FIG. 2 by an arrow A1. The movement direction A1 in fact corresponds to the direction vector of the movement line of the applicator 6. This vector is parallel to the surface to be coated at all times. Thus, if the surface to be coated is planar, the movement line of the applicator is a straight line. Conversely, if the surface to be coated is curved, the movement line of the applicator is a curve, with a curve radius substantially equal to that of the curved surface.

Figure 3:
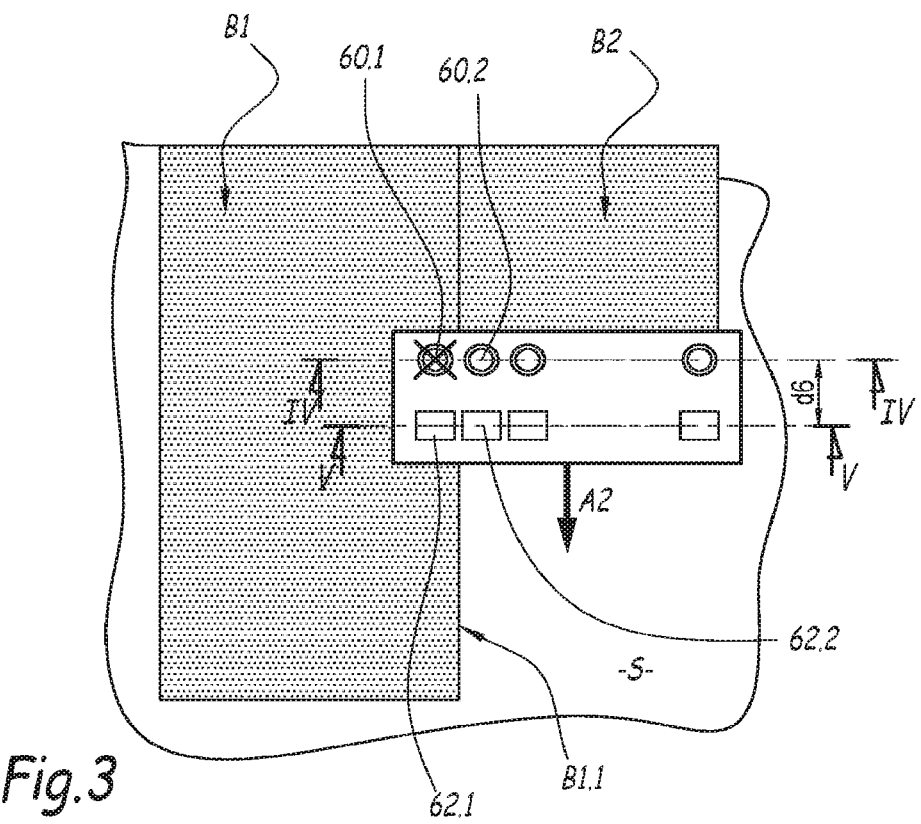
FIG. 3 is a view similar to FIG. 2, showing the coating product applicator in a configuration where it makes a second pass over a surface to be coated, so as to apply a second stripe adjacent to the first stripe.

FIG. 3 illustrates a step b) during which the applicator 6 makes a second pass to apply a second stripe B2 adjacent to the first stripe B1. To that end, the movement direction of the applicator 6 during this second pass, which is shown in FIG. 3 by an arrow A2, is substantially parallel to the movement direction A1 of the applicator during the first pass. Thus, if the movement line of the applicator 6 during the first pass is a first curve, the movement line of the applicator during the second pass is a second curve parallel to the first curve. Any plane normal to one curve from among the first and second curves is then also a plane normal to the other, the distance between two respective points of the two curves that are contained in this normal plane being substantially constant. These two curves can therefore be seen as two rails of a railroad track connected by crosspieces with a constant length, the crosspieces always remaining orthogonal to the rails.

During the second pass, the applicator 6 is moved, during step b), as if to partially cover the first stripe B1; i.e., as if to cover the edge B1.1 of the first stripe B1 intended to be adjacent to the second stripe B2. The coverage is thus forced. This is particularly visible in FIG. 3, where one can see that the applicator 6 slightly overhangs the first stripe B1. If all of the valves 66.1 to 66.*i* were open during the second pass by the applicator 6, the first stripe B1 would then be covered over a certain width. In the example, the coverage width corresponds approximately to the width of the surface covered by a drop from the first nozzle once that drop has spread. Alternatively, the coverage width can be the surface covered by several nozzles after spreading, in particular four or five successive nozzles. In practice, the coverage width depends on several parameters related to the imprecision of the robot, the tubing phenomenon, repeatability problems, or the allowances of the jets. The coverage width is comprised between approximately 1 mm and 5 mm.

Figure 5:
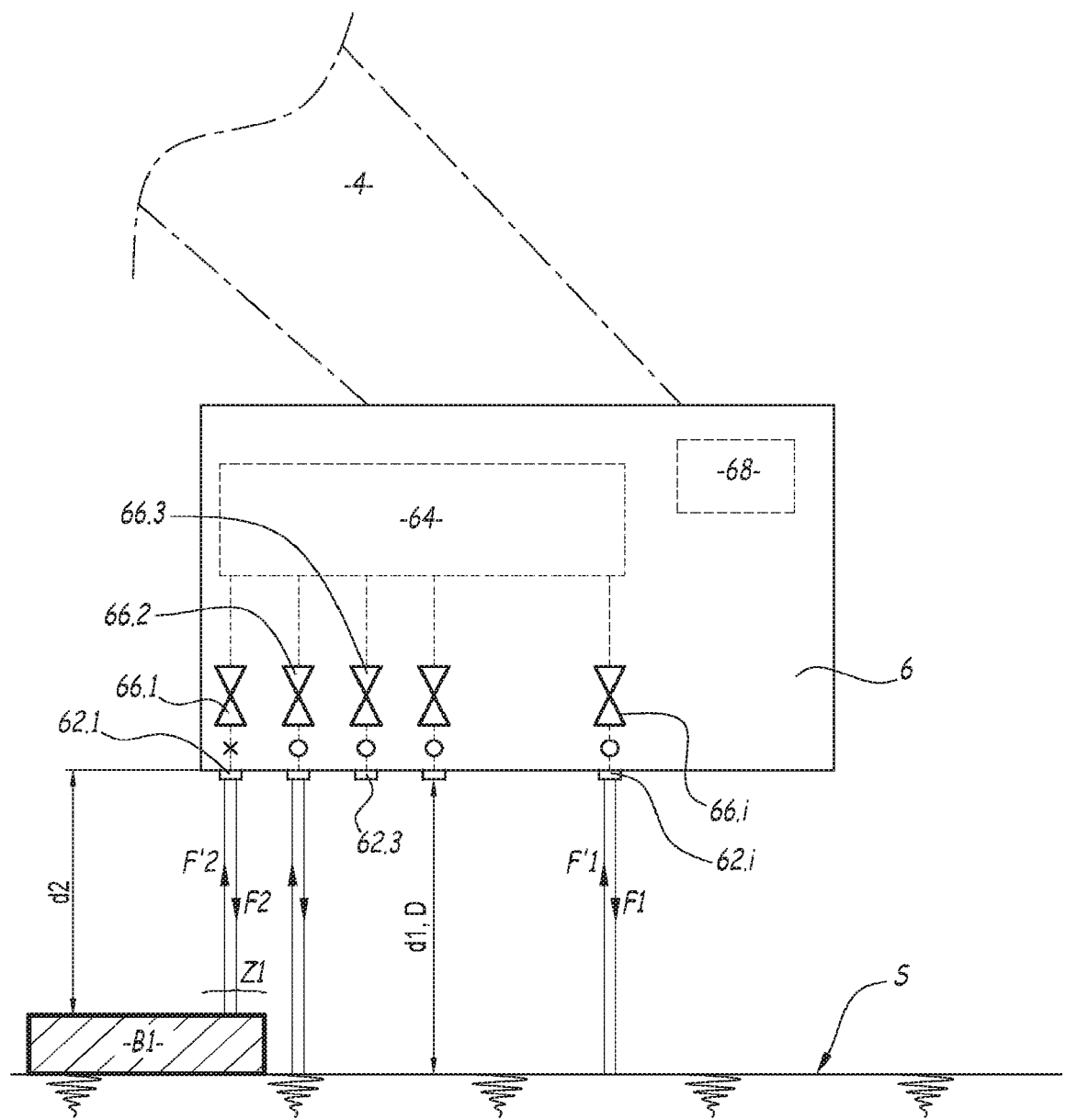
FIG. 5 is a schematic sectional view of the applicator along line V-V of FIG. 3.

As shown in FIG. 5, during a sub-step b1) of step b), the distance sensor 62.1 measures, at a moment t, the distance separating it from the surface to be coated S. As explained above, this measured distance corresponds to the application distance of the nozzle 60.1 at moment t+Δt. During sub-step b1), the distance sensor 62.1 therefore measures the application distance of the nozzle 60.1 at a point up ahead of it on the path of the applicator 6.

The electronic control unit 68 then collects the distance measured by the sensor 62.1 and, during a sub-step b2), compares this distance with the reference value D.

An application zone of the nozzle is defined as a portion of the surface to be coated intended to be covered with coating product by the nozzle. In other words, within the meaning of the present application, the application zone of a nozzle is not the zone that the nozzle is capable of coating at the moment t, but the zone that the nozzle will be capable of coating at the moment t+Δt on the path of the applicator 6.

If the robot follows its setpoint trajectory, the distance measured by the distance sensor 62.1 at a point ahead of the first nozzle 60.1 on the path of the applicator is substantially below a reference value D. This means that the application zone of the first nozzle at a point up ahead on the path of the applicator is already covered with coating product. The valve 66.1 of the first nozzle 60.1 is then closed during a sub-step b3) of the method according to the invention, and no coating product is applied by the first nozzle 60.1 when the latter reaches the point up ahead; i.e., at the moment t+Δt. An over thickness is thus avoided at the junction between the two stripes B1 and B2.

During the operation of the applicator 6, the electronic control unit 68 considers that the value measured by a sensor is substantially lower than the reference value D when the difference between the two values, representing the actual thickness of the coating product deposited on the surface S, is less than 50% of the theoretical wet thickness. The theoretical wet thickness corresponds to the thickness of the coating product on the surface S that one wishes to deposit before drying. For example, the electronic control unit 68 can consider that the value measured by the sensor is substantially lower than the reference value D when the difference between the two values is less than 20 μm.

Conversely, if, during step b), the robot deviates from its setpoint trajectory, the distance measured in step b1) by the distance sensor 62.1 at a point ahead of the first nozzle 60.1 on the path of the applicator 6 is substantially equal to the reference value D. This means that the application zone of the first nozzle 60.1 at a point up ahead on the path of the applicator 6 is not covered with coating product. In this case, the valve 66.1 of the first nozzle 60.1 is open. The first nozzle then coats the surface S when it reaches the point up ahead on the path of the applicator; i.e., at moment t+Δt. This makes it possible to avoid zones that are not covered between the stripes B1 and B2 and obtain a perfect junction between the two layers of coating product B1 and B2.

The aforementioned steps are reiterated, at each moment over the course of the movement of the applicator 6; i.e., dynamically, with a frequency of about 1 ms.

In the configuration of FIG. 5, the application zone Z1 of the nozzle 60.1 is covered by the stripe B1 applied during the first pass by the applicator 6. Thus, the laser beam F2 emitted by the sensor 62.1 is reflected by the coating stripe B1 in a laser beam F'2, which is received by the receiving cell of the sensor 62.1. The time elapsed between the emission of the laser beam and the reception of the reflected laser beam is representative of the distance d2 between the sensor 62.1 and the coating layer B1. The sensor 62.1 communicates the distance d2 to the unit 68, which compares it with the reference value D. The distance d2 being shorter than the distance D, the electronic control unit 68 closes the valve 66.1 of the nozzle 60.1, as symbolized in FIG. 4 by a cross.

Conversely, the laser beam F1 emitted by the other sensors 62.2 to 62.i is reflected in a laser beam F'1 directly by the surface S to be coated. The distance d1 measured by the sensors 62.2 to 62.i therefore substantially corresponds to the aforementioned reference value D. The electronic control unit therefore does not close the corresponding valves 66.2 to 66.i, as symbolized by the drops of product in FIG. 4. The width of the second stripe B2 is therefore smaller than that of the first stripe B1.

Advantageously, the distance sensors 62.1 to 62.i measure, at each moment t, the application distance of each of the nozzles 60.1 to 60.i at moment t+Δt. The electronic control unit 68 then compares each of the values measured by the sensors 62.1 to 62.i with the reference value D. The electronic control unit 68 then closes all of the valves for which the distance measured by the corresponding sensors is below the reference value D and opens the other valves; i.e., all of the valves for which the distance measured by the corresponding sensors is substantially equal to the reference value D.

Figure 6:
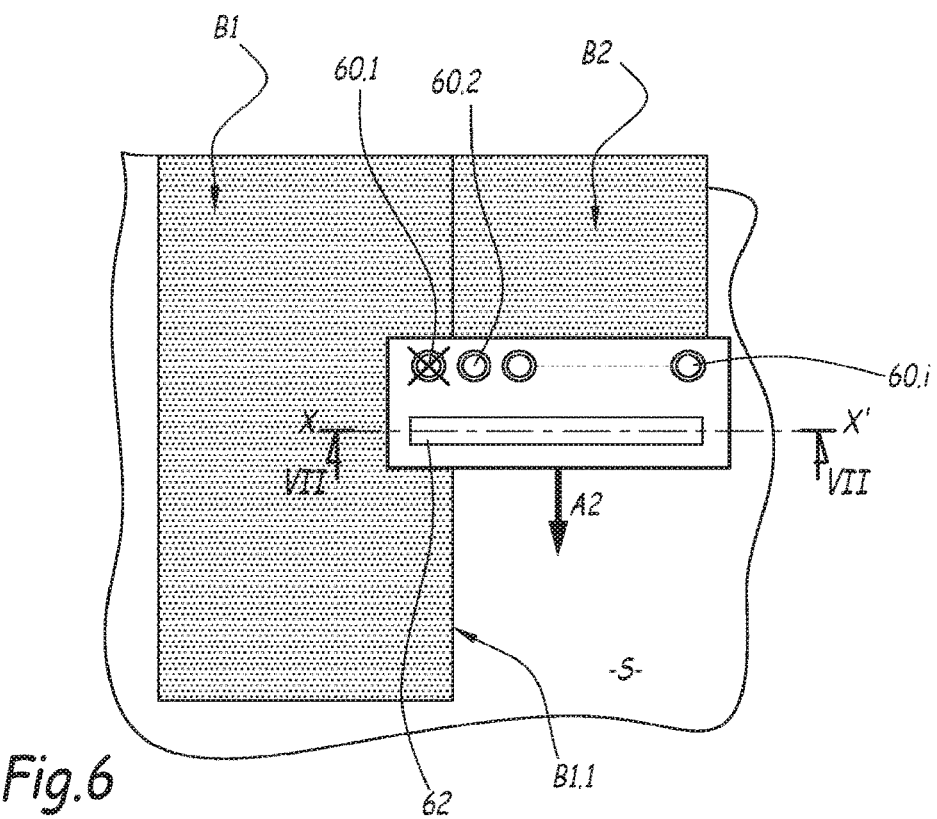
FIG. 6 is a view similar to FIG. 3, in which the applicator is according to a second embodiment of the invention.
Figure 7:
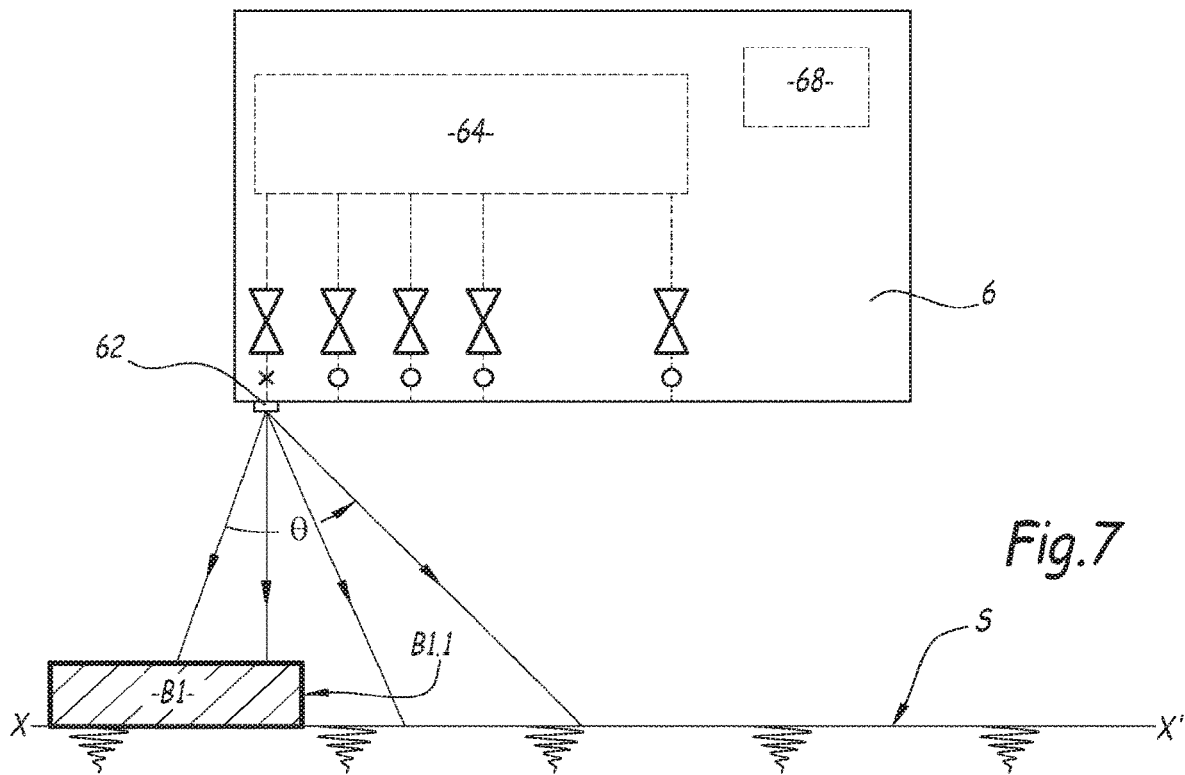
FIG. 7 is a schematic sectional view along line VII-VII of FIG. 6.
Figure 8:
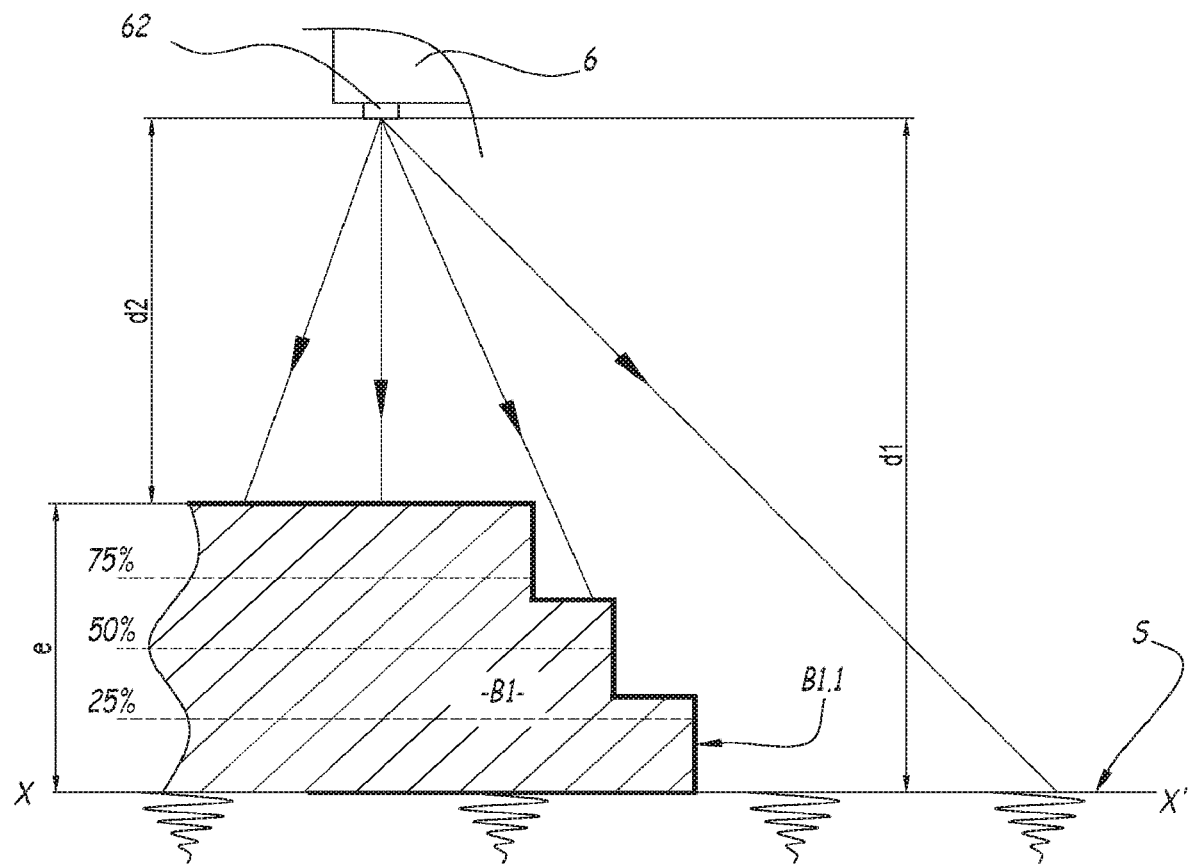
FIG. 8 is a diagram relative to a third embodiment of an applicator according to the invention.

FIGS. 6 to 8 show a second and third embodiment of an applicator 6 according to the invention. Below, only the differences with respect to the first embodiment are mentioned in the interest of concision. Furthermore, all of the elements of the applicator 6 retain their numerical reference.

In the second embodiment shown in FIGS. 6 and 7, the applicator 6 comprises only one distance sensor 62, which is positioned on the side of the first nozzle 60.1. This distance sensor 62 differs from the distance sensors 62.1 to 62.i in that it is able to scan, with its laser beam, a line extending in a plane perpendicular to the movement direction of the applicator 6. The scanning angle θ of the sensor 62 is such that the distance sensor 62 is able to determine the distance profile of the nozzles 60.1 to 60.i; i.e., to measure the application distance of several successive nozzles at points further ahead relative to the latter on the path of the applicator 6.

Advantageously, the scanning angle θ of the sensor 62 is such that the distance sensor 62 is able to measure the application distance of each of the nozzles 60.1 to 60.i at points further ahead relative to the latter on the path of the applicator 6.

For example, the scanning angle θ of the sensor 62 can be comprised between 10° and 120°, preferably about 90°.

One advantage of this second embodiment is that a single distance sensor is used for all of the nozzles, which limits the cost of the applicator 6.

The method of applying the coating product using the applicator 6 according to this second embodiment differs from the method described above in relation to the embodiment of FIGS. 1 to 5 as follows.

During sub-step b1), the distance sensor 62 measures the application distance of each of the nozzles 60.1 to 60.i at points further ahead relative to those on the path A2 of the applicator 6. The electronic control unit 68 then collects these values from the sensor 62.

Based on the distances measured by the distance sensor 62, the electronic control unit 68 establishes a surface profile over all or part of the application width of the applicator 6, and therefore a thickness profile of the coating applied on the surface. The surface profile of the part corresponds to the intersection between the surface S to be coated in a plane perpendicular to the movement direction of the applicator 6. What we call surface profile in reality is therefore a line.

For a covering method, i.e., consisting of applying two layers of coating product to be adjacent, this thickness profile approximately corresponds to a step function with a step value corresponding to the thickness of the layer of coating product B1 applied on the surface. The electronic control unit is capable, by analyzing the values of distances measured by the sensor 62, of determining the position of the edge B1.1 of the first stripe B1 along the surface profile.

In the considered example, the surface is planar, such that the surface profile can be likened to a straight line X-X' perpendicular to the movement direction of the applicator 6 and perpendicular to a spraying axis of the modules 60.1 to 60.i. This is called a thickness edge.

The position of the edge B1.1 corresponds to the position of the point from which a clear distance variation measured by the sensor 62 is observed, this variation being due to the presence of the layer of coating product B1. The sensitivity of the distance sensor 62 is such that the electronic control unit is capable of detecting the thickness edge irrespective of the surface geometry to be coated; i.e., even for a warped surface. Indeed, the precision of each sensor is less than 10 μm, in particular about 1 μm.

Thus, the electronic control unit 68 closes all of the valves that are positioned on a first side of the edge B1.1 and opens the valves that are positioned on the second side of the edge B1.1. The first side of the edge B1.1 corresponds to the side where the surface S is coated with product to the left of the edge B1.1 in FIG. 7, while the second side of the edge B1.1 corresponds to the side where the surface S has no coating product, to the right of the edge B1.1 in FIG. 7. For example, if the position of the edge B1.1 along the axis X-X' determined by the electronic control unit 62 is between the application points of the nozzles 60.2 and 60.3, the electronic control unit 68 closes the valves of the nozzles 60.1 and 60.2 and opens the other valves.

During the second pass by the applicator 6, the coating product is therefore only deposited in the locations of the surface S that are not covered by the stripe B1. It is thus possible to compensate a path defect of the robot and provide a perfect junction between the two stripes B1 and B2, with no over thickness.

In the third embodiment, explained below in relation to FIG. 8, the applicator 6 comprises valves 66.1 to 66.i with a controllable flow rate, or proportional valves. In the example, the valves 66.1 to 66.i are piezoelectric valves whose excitation frequency can be adjusted based on the desired flow rate.

Alternatively, the valves 66.1 to 66.i are solenoid valves of the shutoff type. The flow rate of the valves is then controlled by adjusting the opening frequency of the valves. According to another alternative, it is also possible to use variable flow rate valves.

From the distance values measured by the sensor 62, the electronic control unit 68 establishes a thickness profile of the layer of coating product in a plane perpendicular to the movement direction of the applicator and monitors the flow rate of the valves 66.1 to 66.i based on the thickness of the layer measured at each of the application points of the nozzles. More specifically, the thickness of the layer is compared at each point with the theoretical thickness of the layer of coating product, this theoretical thickness being recorded in memory in the electronic control unit.

If, for example, the thickness computed by the unit 68 at a point is comprised between 0 and 25% of the maximum thickness e, the flow rate of the corresponding valve corresponds to 100% of the maximum flow rate. Conversely, if the thickness computed by the unit 68 at a point is comprised between 25% and 50% of the theoretical thickness, the flow rate of the corresponding valve corresponds to 75% of the maximum flow rate. If the thickness computed by the unit 68 at a point is comprised between 50% and 75% of the theoretical thickness, the flow rate of the corresponding valve corresponds to 50% of the maximum flow rate. Lastly, if the thickness computed by the unit 68 at a point is comprised between 75% and 100% of the theoretical thickness, the corresponding valve is closed.

The applicator 6 according to the third embodiment has the advantage that if the edge B1.1 of the stripe B1 is not a clean edge, for example due to the spreading of the coating product, the flow rate of the valves belonging to the nozzles arranged to apply the coating product on the edge B1.1 is controlled to offset the lack of thickness at the junction.

FIGS. 9 to 12 show a fourth embodiment and a fifth embodiment of an applicator 6 according to the invention. Below, only the differences with respect to the first embodiment are mentioned in the interest of concision. Furthermore, all of the elements of the applicator 6 retain their numerical reference.

Figure 9:
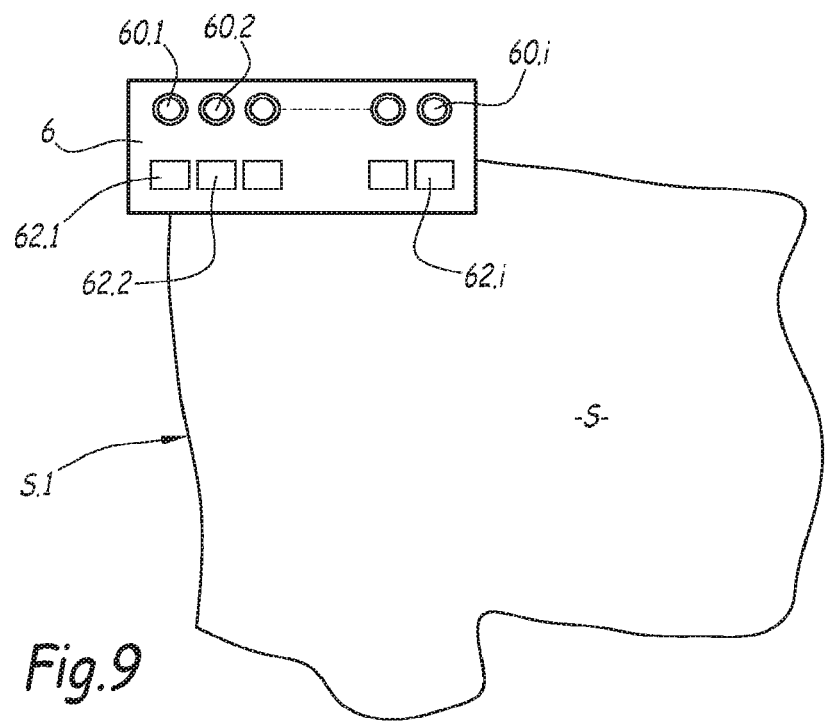
FIGS. 9 and 10 are views similar to FIG. 3 and show a coating product applicator according to a fourth embodiment, in a configuration where it makes a pass along an edge of a surface to be coated.
Figure 10:
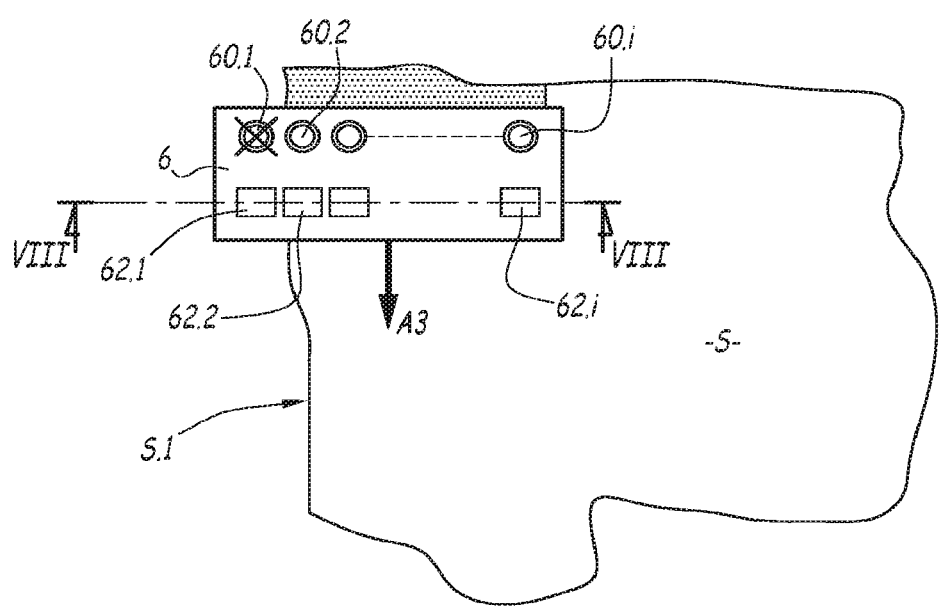
Figure 11:
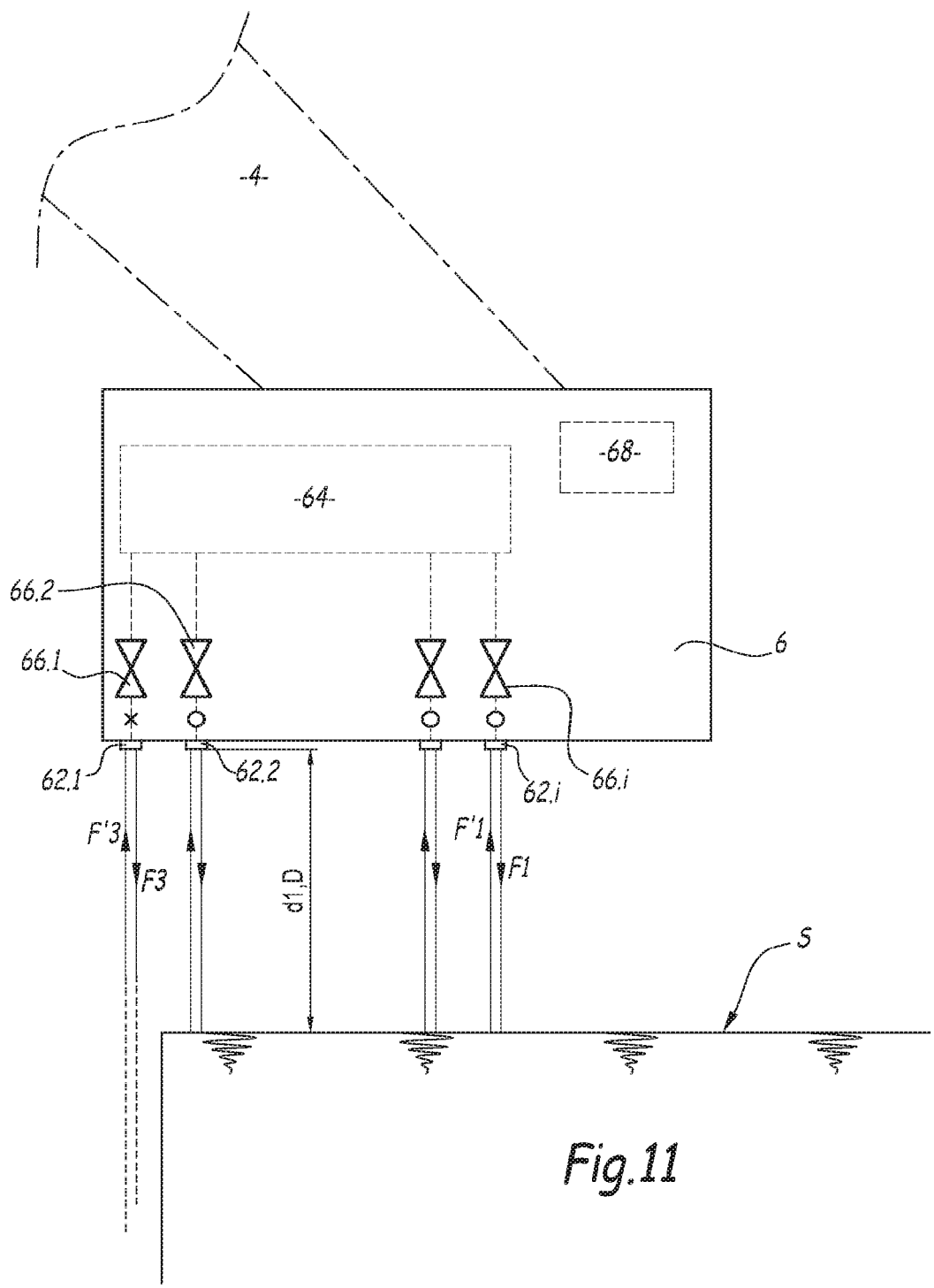
FIG. 11 is a schematic sectional view of the coating product applicator in plane XI-XI of FIG. 10.

The applicator 6 of FIGS. 9 to 11, according to the fourth embodiment, differs from that of the first embodiment by the programming of the electronic control unit 68. This particular programming of the unit 68 seeks to avoid wasting coating product by applying coating product in empty space. This programming is advantageous if the applicator 6 is used to paint a surface defining the edge of a part, for example a longitudinal edge of the roof of a car.

In the continuation of the description, the applicator 6 is considered to be oriented such that the first nozzle 60.1 is the nozzle of the row closest to the edge S.1 of the surface to be coated S. During the application of the coating product, the applicator 6 is moved along the edge of the part to be coated, as shown by arrow A3 in FIG. 9. The sensor 62.1 associated with the first nozzle 60.1 then measures, at each moment t, the distance that separates it from the first object on which the beam S3 that it emits is reflected. To that end, it assesses the time between the emission of the laser beam F3 and the reception of the reflected laser beam F'3. This distance corresponds to the application distance of the first nozzle 60.1 at a moment t+Δt.

If this distance is substantially greater than the reference value D, this means that, at the moment t+Δt, the part to be coated will not be in the field of application of the nozzle 60.1. The electronic control unit 68 then closes the valve 66.1 of the first nozzle 60.1 so as not to apply coating product through the nozzle 60.1 at moment t+Δt and to thereby avoid wasting coating product. In this second embodiment, the sensors 62.2 to 62.i and the valves 66.2 to 66.i are also optional to carry out the invention.

Advantageously, the distance sensors 62.1 to 62.i dynamically measure, at each moment t, the application distance of each of the nozzles 60.1 to 60.i at a point up ahead on the path of the applicator 6. The robot 2 therefore determines, in real time, whether the distance measured by each of the sensors 62.1 to 62.i is greater than the reference value D. The electronic control unit 68 then closes all of the valves for which the distance measured by the corresponding sensors substantially exceeds the reference value D and opens the other valves; i.e., all of the valves for which the distance measured by the corresponding sensors is substantially equal to the reference value D.

Controlling each of the valves 66.1 to 66.i based on the distances measured by their respective sensors makes it possible to apply a coating product on very warped surfaces, like the surface S of FIGS. 9 and 10, which defines a curvilinear edge S.1, while moving the applicator 6 in a straight line and without losing coating product.

Figure 12:
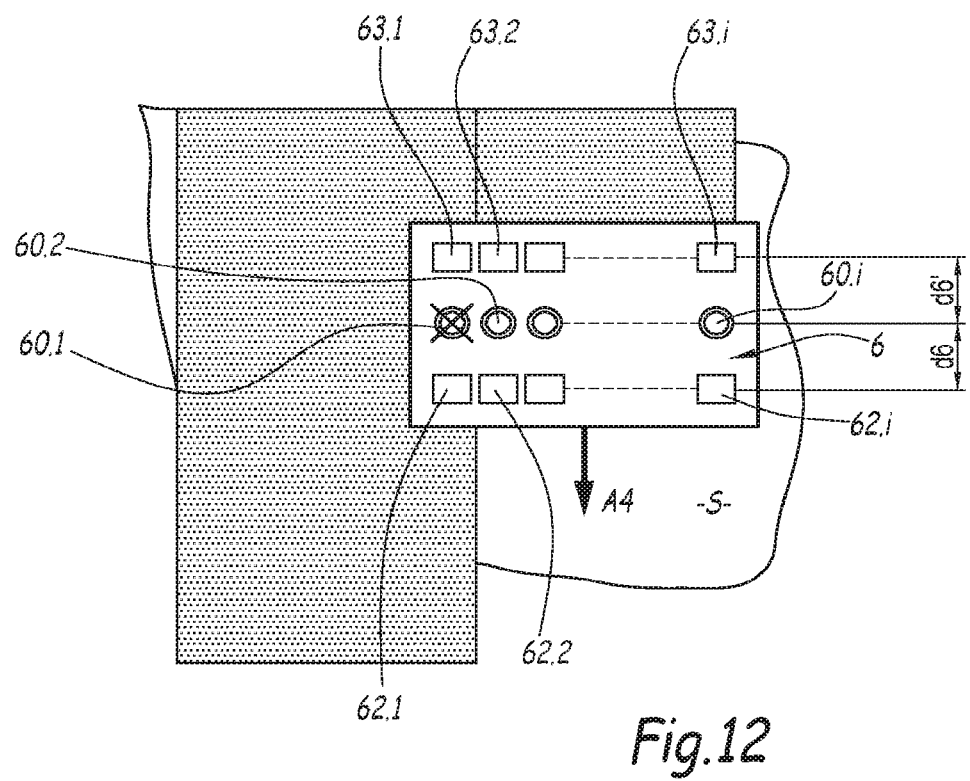
FIG. 12 is a view similar to FIG. 3 showing a coating product applicator according to a fifth embodiment of the invention.

The applicator 6 of FIG. 12, according to the fifth embodiment, differs from that of the first embodiment in that it further comprises a second row of distance sensors, respectively referenced 63.1 to 63.i, which are positioned perpendicular to the movement A4 of the applicator 6. The sensors 63.1 to 63.i are thickness measuring sensors positioned on a delay relative to the nozzles 60.1 to 60.i on the path of the applicator 6. Thus, the position of the nozzles 60.1 to 60.i at the moment t corresponds to the position of the sensors 63.1 to 63.i at the moment t+Δt', where Δt' is a duration that depends on the movement speed of the applicator 6 and the distance d6' between the row of nozzles 60.1 to 60.i and the row of sensors 62.1 to 62.i, measured parallel to the movement direction of the applicator 6. If the distance d6' is equal to the distance d6 previously defined, the duration Δt' is equal to the duration Δt. Otherwise, the durations Δt and Δt' are different. The distance sensors 63.1 to 63.i are identical to the distance sensors 62.1 to 62.i and make it possible to measure the thickness of the film of coating product applied by the applicator 6. To that end, the distance applicator 63.1 to 63.i sends the distance that it measures to the electronic control unit 68, which compares the measured distances with the reference value D to determine the thickness of the film of coating product applied on the surface S. The sensors 63.1 to 63.i therefore make it possible to check the uniformity of the thickness of the film deposited by the applicator 6.

Advantageously, if the sensors 63.1 to 63.i detect zones of the surface S where the thickness of the film of coating product is smaller than the desired thickness, the applicator 6 can make a new pass, to make the thickness of the coating product applied on the surface S uniform.

In an alternative applicable to the fifth embodiment, the applicator 6 comprises only one thickness measuring sensor, comparable to the distance sensor 62.

Figure 13:
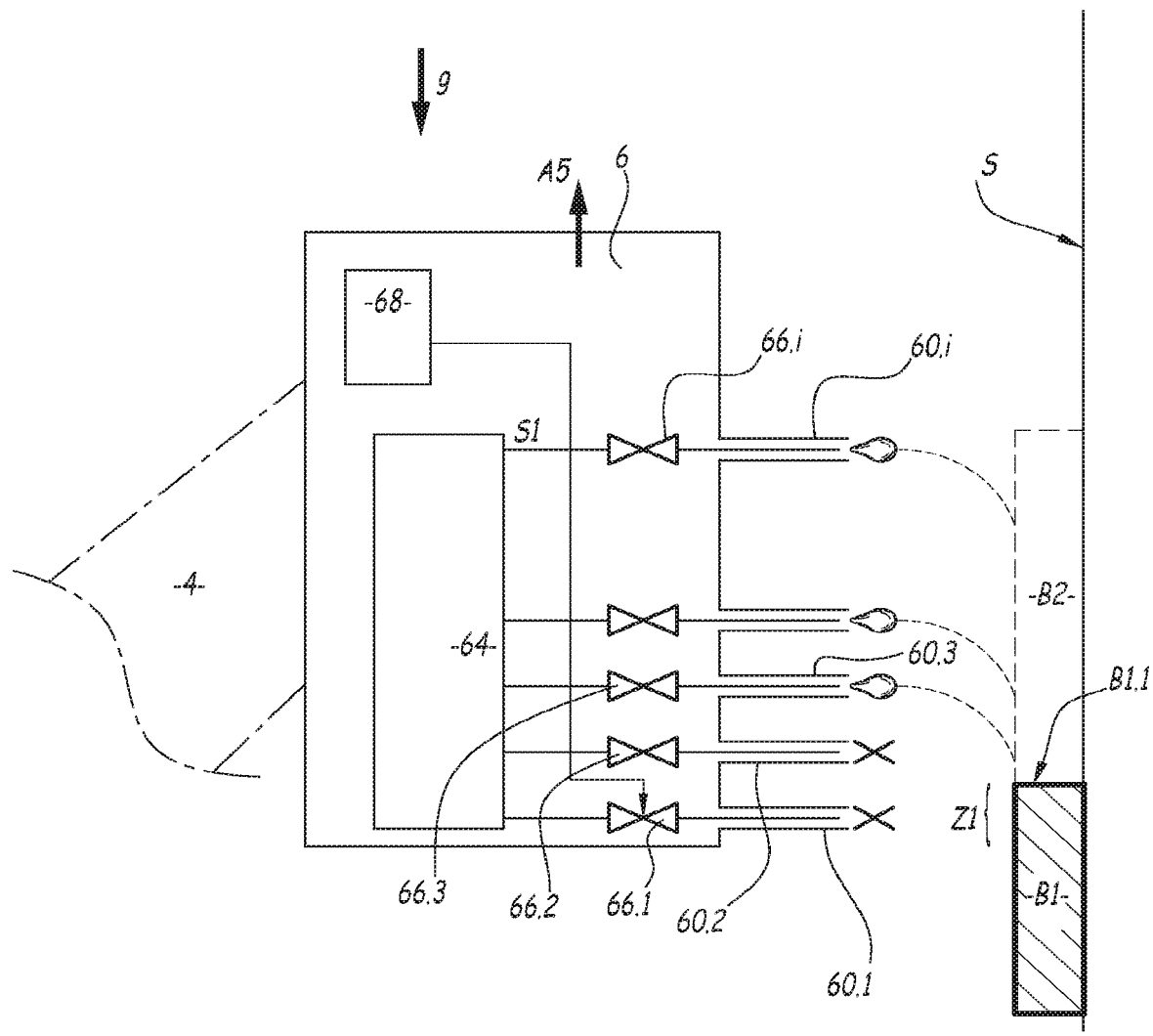
FIG. 13 is a view similar to FIG. 4 for a coating product applicator according to a sixth embodiment of the invention, this applicator being designed to offset the effect of gravity as well.

FIG. 13 shows a coating product applicator according to a sixth embodiment of the invention. Below, only the differences with respect to the first embodiment are described in the interest of concision.

The applicator of FIG. 13 is designed to compensate the effect of gravity g on the drops of product discharged through the nozzles 60.1 to 60.i.

Indeed, when the printing head 6 is in the configuration of FIGS. 1 to 12, the effect of gravity g is negligible on the direction of the drops of coating product discharged through the nozzles 60.1 to 60.*i*. However, when the printing head is inclined by 90°, as shown in FIG. 13, the drops of coating product are deflected, under the effect of gravity g, relative to the spraying axis of the nozzles, which is horizontal in the example. The deflection of the drops can cause coverage flaws and/or over thickness zones.

To avoid this, the applicator 6 is repositioned when the surface S to be coated is vertical or inclined. This repositioning step consists of moving the applicator 6 with a certain amplitude and in a direction A5 parallel to an axis of the row of nozzles 60.1 to 60.*i* to offset the deviation of the coating product due to gravity g. Thus, the direction A5 of this offset is oriented upward. It is also perpendicular to the movement direction of the applicator, which, in the example of FIG. 13, is perpendicular to the plane of FIG. 13.

The movement amplitude of the applicator 6 during the repositioning step is computed dynamically based on the incline of the applicator 6 relative to the ground, the application distance of the nozzles 60.1 to 60.*i*, the ejection speed of the product through the nozzles and the size of the drops of coating product, with the understanding that the size of the drops corresponds to the size of the nozzles 60.1 to 60.*i*. All of these parameters are recorded in memory in the controller of the robot 2, which is not shown in the figures. The incline value of the applicator 6 relative to the ground is updated automatically based on the orientation of the applicator 6 in the "tool" reference.

The amplitude of the offset can also be extracted from a prerecorded abacus, in which all of the movement values to be applied to compensate the effect of gravity based on the different influencing parameters are recorded.

The repositioning step is carried out by the multiaxis robot 2. More specifically, the amplitude of the offset is computed by the controller of the robot, which sends a control signal to the actuator of the robot arm to move the applicator in the provided direction and with the provided amplitude.

In an alternative to this sixth embodiment, the electronic control unit 68 is programmed to close the valve of the nozzle(s) that may, due to gravity, spray coating product on a zone Z1 of the surface S that is already covered. In the example of FIG. 13, the applicator 6 moves at an altitude such that the nozzles 60.1 and 60.2 are able to spray drops of product on the zone Z1 already covered by the stripe B1 of coating product. The valves 66.1 and 66.2 are therefore closed. The valves to be closed are primarily identified based on the altitude of the applicator 6 relative to the stripe B1 of coating product covering part of the surface S. Other parameters must also be taken into account, such as the incline of the applicator 6 relative to the ground, the application distance of the nozzles, the ejection speed of the product through the nozzles and the size of the drops of coating product. The altitude of the applicator 6 is a setpoint parameter controlled by the robot controller. One advantage of this alternative is that this makes it possible to resolve the problem of the deflection of the drops of coating product under the effect of gravity without using a very precise robot, since there is no offset.

Figure 14:
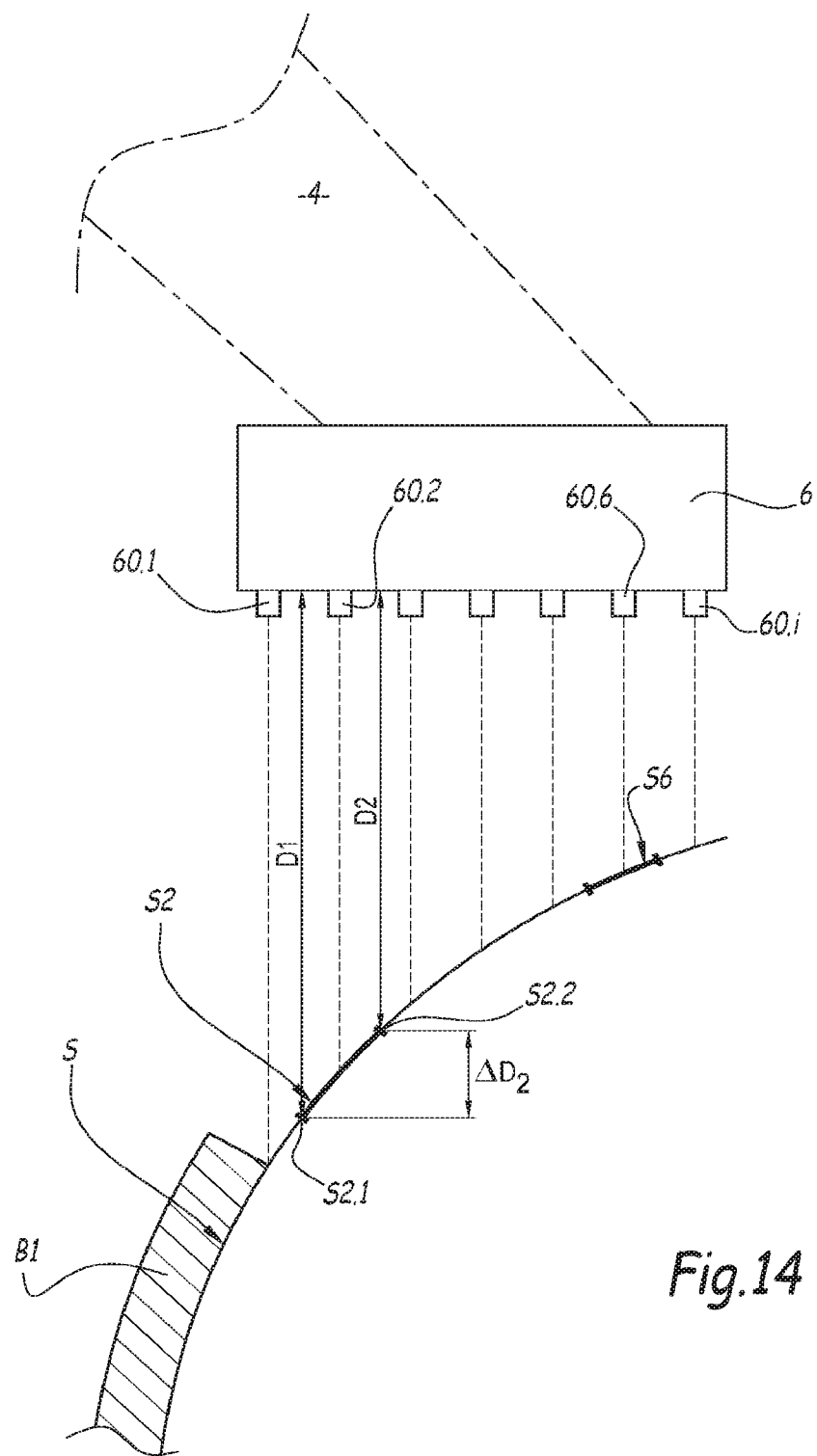
FIG. 14 is a view similar to FIG. 4 for a coating product applicator according to a seventh embodiment of the invention, this applicator being designed to obtain flawless coverage, even on a warped surface.

FIG. 14 shows a coating product applicator according to a seventh embodiment of the invention. Below, only the differences with respect to the other embodiments are described in the interest of concision.

The applicator of FIG. 14 is designed to obtain flawless coverage, even on a warped surface S. In a manner comparable to the third embodiment, the applicator 6 of FIG. 14 comprises proportional valves.

During step b) previously described, each nozzle 60.*k* from among the nozzles 60.1 to 60.*i* is intended to coat a certain portion Sk of the surface S, k being a natural integer between 1 and i.

For example and in reference to FIG. 14, the nozzle 60.2 is intended to coat the portion S2 of the surface S during the movement of the applicator 6, while the nozzle 60.6 is intended to coat the portion S6 of the surface S. In the plane of FIG. 14, these surface portions appear in the form of segments in bold lines. The respective portions of the nozzles 60.1 to 60.*i* are adjacent. The width of the surface portions Sk depends on the width of the nozzles and the spreading coefficient. When the surface portion Sk is substantially perpendicular to the spraying axis of the nozzles, the area of the surface portion Sk substantially corresponds to the area of the coated surface, under a nominal flow rate, once the drop from the nozzle 60.*k* has spread.

Conversely, when the surface portion Sk is not substantially perpendicular to the spraying axis of the nozzles, as is for example the case for the surface portion S2 relative to the nozzle 60.2, the area of the coated surface, under a nominal flow rate, is smaller than the area of the surface portion Sk to be coated. There is therefore a coverage flaw.

To overcome this coverage flaw, the flow rate of each nozzle 60.*k* from among the nozzles 60.1 to 60.*i* is monitored based on the incline of the respective surface portion Sk relative to a plane perpendicular to the spraying direction of the nozzles 60.1 to 60.*i*. In the configuration of FIG. 14, this plane is horizontal.

The applied flow rate is higher when the corresponding surface portion to be coated is inclined, so as to offset the lack of coating product.

The incline of each surface portion Sk relative to the plane perpendicular to the spraying axis of the nozzles is computed by the electronic control unit 68 by determining the distance deviation $\Delta D_k$, measured parallel to the spraying axis of the nozzles 60.1 to 60.*i*, between two end points Sk.1 and Sk.2 of each surface portion Sk. These two points are positioned, along the surface profile, on opposite border lines of the surface portion Sk, these border lines extending parallel to the movement direction of the applicator 6.

In FIG. 14, the end points of the surface portion S2 are shown with their references S2.1 and S2.2, the deviation between these two points being represented by the measurement $\Delta D_2$ corresponding to the difference between the distance D1 and the distance D2. For the case of the surface portion S2, the electronic unit 68 therefore compares a distance D1, measured parallel to the spraying axis of the nozzles, between the point S2.1 and the distance sensor, and a distance D2, measured parallel to the spraying axis of the nozzles, between the point S2.2 and the distance sensor.

Thus, the coating product flow rate flowing through a nozzle 60.*k* is higher as the distance deviation $\Delta D_k$ becomes higher. Advantageously, the relationship between the flow rate and the distance deviation $\Delta D_k$ is a linear-type relationship.

For example, as shown in FIG. 14, the surface portion S6 intended to be covered by the nozzle 60.6 has a smaller area than the surface portion S2 intended to be covered by the nozzle 60.2. Thus, the flow rate of coating product applied by the nozzle 60.2 is higher than the flow rate of coating product applied by the nozzle 60.6.

In an alternative that is not shown, the applicator 6 comprises several rows of nozzles aligned with one another.

According to another alternative applicable to the fifth embodiment, the applicator 6 further comprises a second row of nozzles positioned downstream of the sensor(s) 63.1 to 63.*i* on the path of the applicator 6. In other words, the second row of nozzles is positioned on a delay relative to each thickness measuring sensor 63.1 to 63.*i* on the path of the applicator 6. This second row of nozzles also comprises i nozzles, which are distributed identically to the row of nozzles 60.1 to 60.*i*. This second row of nozzles makes it possible to offset any coverage flaw, or lack of thickness, detected by the sensor(s) 63.1 to 63.*i* and to thereby homogenize the thickness of the applied layer of coating product without to-and-fro journeys. Such a lack of thickness may appear when a nozzle in the first row; i.e., the upstream row of nozzles 60.1 to 60.*i*, is clogged, or at least has a malfunction. A lack of thickness may also appear when coating a warped surface, as shown in FIG. 14 relative to the seventh embodiment, or upon faulty coverage at the junction between two stripes of coating product. Another advantage of this alternative is that the control of the valves 66.1 to 66.*i* of the first row of nozzles can be simplified because the coverage flaws can be corrected practically instantaneously.

According to another alternative that is not shown, the applicator 6 comprises a single valve 66.1, corresponding to the valve of the first nozzle 60.1 of the row. In this case, the applicator 6 comprises only one sensor 62.1 provided to measure the application distance of the first nozzle 60.1 at a point up ahead of it on the path of the applicator 6.

According to another alternative that is not shown, only the first nozzle 60.1 and the last nozzle 60.*i* of the row include a valve 66.1 and 66.*i*, respectively. In this case, the applicator 6 comprises only two distance sensors 62.1 and 62.*i*, respectively, provided to measure the application distance of the first nozzle 60.1 and the last nozzle 60.*i*, respectively, at a point up ahead of them on the path of the applicator 6.

According to another alternative that is not shown, other types of distance sensors can be considered, such as ultrasound sensors.

The features of the alternatives and embodiments of the invention mentioned above may be combined with one another to create new embodiments of the invention.

The invention claimed is:

1. A method of applying a coating product on a surface of a part, carried out using an applicator comprising a row of nozzles, each nozzle including a valve, wherein the nozzles are disposed along an axis of the row, the method comprising:
   moving the applicator in a first direction to apply a first layer of coating product; and
   moving the applicator in a second direction substantially parallel to the first direction to apply a second layer of coating product adjacent to the first layer, comprising:
      collecting application distances of at least certain nozzles, including the first nozzle, in the row from forward points ahead of the nozzles on a journey of the applicator, in order to determine a surface profile to be coated over all or part of an application width of the applicator;
      based on said collecting, analyzing the surface profile to detect the position of an edge of the first layer of coating product along the surface profile, wherein some of the nozzles are positioned on one side of the detected edge, and some of the nozzles are positioned on another side of the detected edge;
      opening each valve that is included in a nozzle that is positioned on the one side of the detected edge; and
      closing each valve that is included in a nozzle that is positioned on the other side of the detected edge.

2. The method according to claim 1, wherein each valve is a proportional valve, and wherein said moving the applicator in a second direction further comprises:
   establishing a thickness profile of the first layer of coating product along the axis; and
   monitoring the flow rate of the valves based on the thickness of the first layer at each of the forward points.

3. The method according to claim 1, wherein each valve is a proportional valve, and wherein said moving the applicator in a second direction further comprises:
   evaluating an incline of a surface portion intended to be covered by each nozzle relative to a plane perpendicular to a spray axis of the nozzles; and
   monitoring a flow rate of coating product applied by each nozzle based on the incline of the surface portion intended to be covered by the nozzle.

4. A method of applying a coating product on a vertical or inclined surface of a part, carried out using an applicator comprising a row of nozzles, among which at least the first nozzle in the row includes a valve, wherein the nozzles are disposed along an axis of the row, the method comprising:
   moving the applicator in a first direction to apply a first layer of coating product, and
   moving the applicator in a second direction substantially parallel to the first direction to apply a second layer of coating product adjacent to the first layer, comprising:
      measuring at least one application distance of the first nozzle from a forward point ahead of the first nozzle on a path of the applicator, and
      based on said measuring at least one application distance, opening or closing the valve of the first nozzle; and
   repositioning the applicator by moving the applicator with a certain amplitude and in a direction parallel to the axis of the row of nozzles to offset a deviation of the coating product due to gravity.

5. The method according to claim 4, further comprising:
   dynamically computing a movement amplitude of the applicator during said repositioning, based on an incline of the applicator relative to the ground, the at least one application distance of the first nozzle, an ejection speed of the coating product through the nozzles, and a size of the nozzles; or
   extracting the movement amplitude from a prerecorded chart.

6. The method according to claim 4, wherein each valve is a proportional valve, and wherein said moving the applicator in a second direction further comprises:
   evaluating an incline of a surface portion intended to be covered by each nozzle relative to a plane perpendicular to a spray axis of the nozzles; and
   monitoring a flow rate of coating product applied by each nozzle based on the incline of the surface portion intended to be covered by the nozzle.

* * * * *